May 16, 1961  J. GULDEMOND ET AL  2,984,773
ALTERNATING CURRENT RECTIFYING ASSEMBLY
Filed March 9, 1960  2 Sheets-Sheet 2

INVENTOR.
JOHN GULDEMOND
HAROLD E. VAN HOESEN
RALPH E. WILLISON
BY Harold T. Stowell
Harold L. Stowell
ATTORNEYS + # United States Patent Office 2,984,773
Patented May 16, 1961

2,984,773

ALTERNATING CURRENT RECTIFYING ASSEMBLY

John Guldemond, Bound Brook, Harold E. Van Hoesen, Somerville, and Ralph E. Willison, North Branch, N.J., assignors to Research-Cottrell, Inc. Bridgewater Township, N.J., a corporation of New Jersey Filed Mar. 9, 1960, Ser. No. 13,826

7 Claims. (Cl. 317—234)

This invention relates to an improved alternating current rectifying assembly and, in particular, to a rectifier assembly employing a plurality of solid semiconductor rectifier elements such as silicon, selenium, and copper oxide rectifiers or crystal diodes.

It is a particular object of the invention to provide a rectifier assembly that can be used in substantially any rectifier circuit requiring a one-way electrical valve and an assembly that can be used without modification to provide, for example, single-phase half-wave, single-phase full-wave, single-phase four-wave bridge, offset half-wave, three-phase half-wave, and three-phase full-wave rectification.

Further objects of the present invention are to provide an alternating current rectifier assembly having improved heat dissipation, decreased complexity, lower material and fabrication costs, and improved thermal expansion provisions.

A further object is to provide, for example, an assembly which may be readily employed to replace electron tubes presently used in electrical precipitation service requiring a rating in the high range of from about 100 to 150 kv. inverse voltage.

A further object is to provide an alternating current rectifier assembly that can be employed for either positive or negative output.

A further object is to provide such an assembly including plug-in means of simple construction whereby the assembly may be inserted in a circuit or removed for replacement or repair without disassembling other elements of the rectifier circuitry.

The invention generally comprises an alternating current rectifier assembly including a hollow cylindrical casing, a plurality of rectifier elements mounted on the casing, conductor means serially connecting each of the rectifier elements, a hollow cylindrical shell telescopically receiving the casing and radially outwardly spaced therefrom, a base member mounting the casing and the shell, an insulating liquid within the casing and between the casing and the shell, an extended surface heat-conducting member presenting one face to the insulating liquid and the other face to ambient air, and the conductor means connecting the first and last of the series connected rectifier elements to separate electrical conductive terminals.

The invention will be more particularly described with reference to the illustrative embodiments thereof wherein.

Single-phase, half-wave rectifier circuits employing a plurality of solid, semi-conductor rectifier elements connected in series to comprise a stack supplied with alternating current from an output lead of a step-up transformer with the last in the series of the rectifier elements connected to one electrode of a load are known in the art. In general, such rectifier elements are provided with a shunt-connected resistor, each having a value of about the same order of magnitude as the rated average inverse resistance of the solid semi-conductor rectifier elements comprising the unit. It will also be appreciated that in addition to the use of the resistors with the solid semiconductor rectifier elements, each of the elements may also be provided with a low microfarad capacitor connected in shunt therewith.

With single-phase, half-wave rectifier circuits, the current flows to the load device only during one-half cycle and the rectifier assembly blocks the applied voltage on the other half-cycle.

Assemblies of solid semi-conductor rectifier elements may be used in many rectifying circuits and as is known four rectifier assemblies may be employed to provide a single-phase, full-wave bridge rectifier circuit. Where such single-phase, full-wave rectifier assemblies are employed, the rectifier assemblies operate in pairs on each half-cycle. The blocking assemblies are subject to the full voltage of the system inversely applied. In this form of circuit, the rectifier assemblies must have a voltage rating of at least equal to the peak output voltage of the applied voltage.

Where single-phase, full-wave rectifier assemblies operate in pairs on each half-cycle, the blocking assemblies are subject to the full voltage of the system inversely applied. In this form of circuit, the rectifier assemblies must have a voltage rating of at least equal to the peak output voltage of the transformer 12′.

While solid semiconductor rectifier elements have been employed in series-connected units to provide alternating current rectifiers, their use has not been widespread in high voltage applications requiring from 50 to, for example 150 kilovolts peak inverse voltages due to the substantial amount of heat which must be dissipated to prevent damage to the rectifier elements and in order to maintain accurate voltage control.

Figure 1:
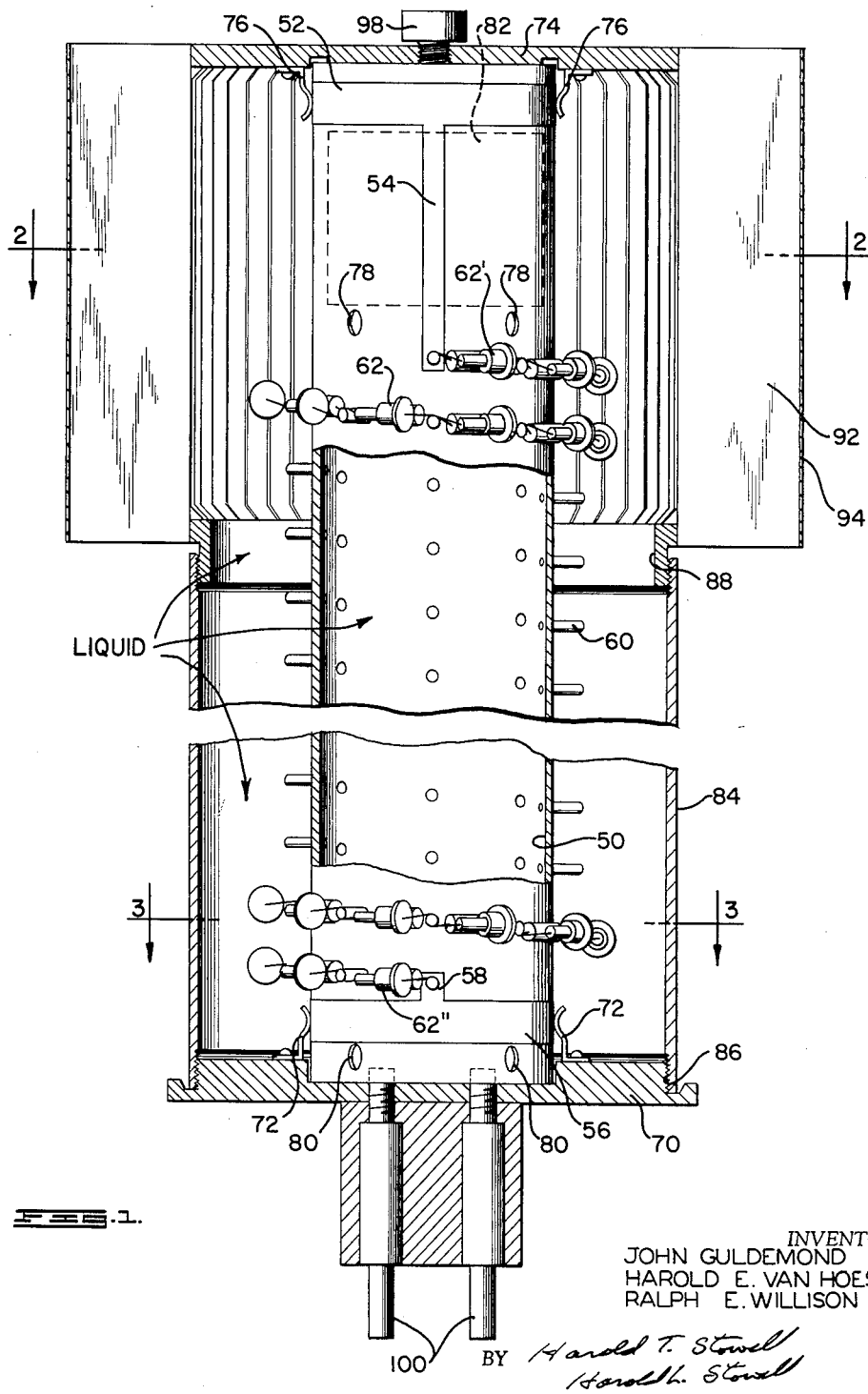
Fig. 1 is a fragmentary vertical sectional view with portions broken away of a preferred form of rectifier assembly constructed in accordance with the present invention.
Figure 2:
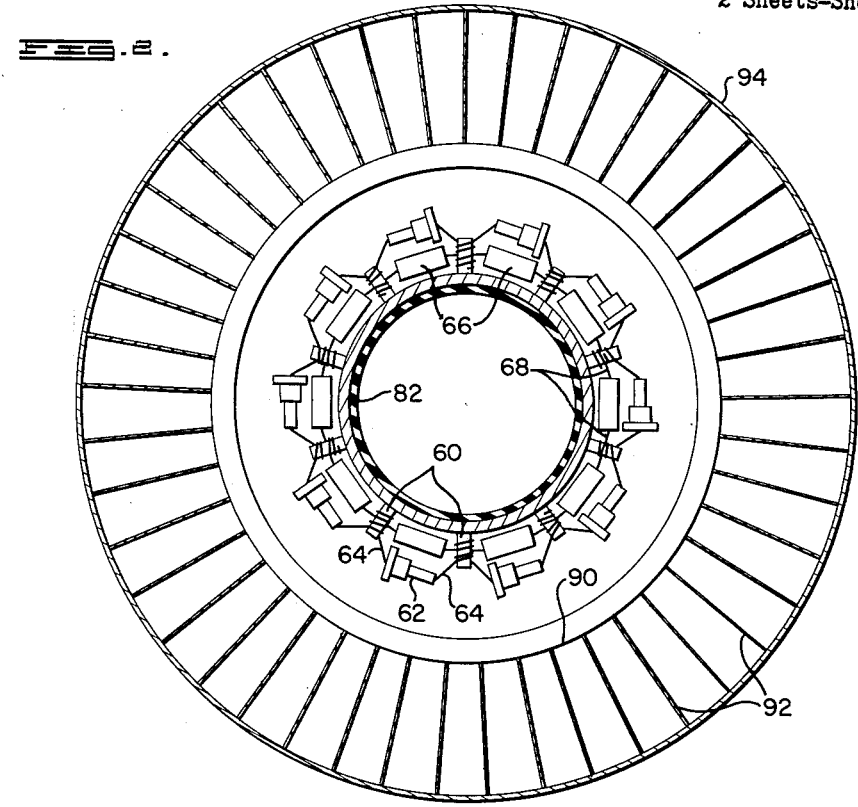
Fig. 2 is a transverse section substantially on line 2—2 of Fig. 1.
Figure 3:
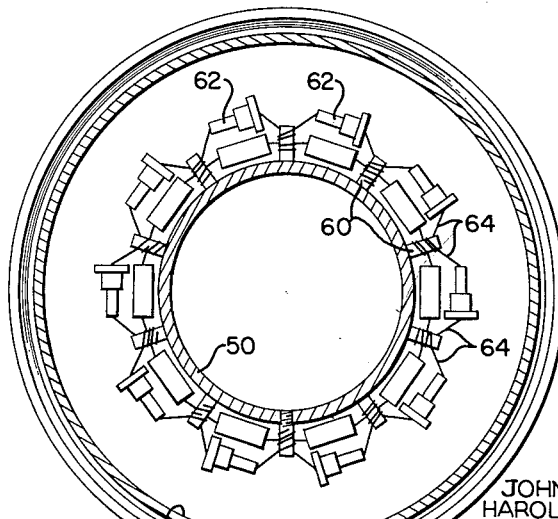
Fig. 3 is a transverse sectional view substantially on line 3—3 of Fig. 1.

Referring to Figs. 1, 2 and 3, an improved rectifier assembly is illustrated, and 50 generally designates an elongate cylindrical preferably electrical insulating casing which casing may be constructed of an electrical insulating material such as a phenolformaldehyde resin composition. The casing is provided with a metallic electrical conductive band 52 provided with a lead-in strip 54. The band and lead-in strip are provided adjacent the upper end of the casing 50 and may be suitably secured thereto such as by heat shrinking the band to the outer surface of the casing. A similar electrical conductive band 56 provided with a contact strip 58 is mounted adjacent the lower end of the casing. Between the inner ends of the conductor strips 54 and 56 are provided a plurality of mounting pegs 60. The mounting pegs in the illustrated form of the invention are secured in bores in the casing, which bores are presented in a spiral array.

Between each pair of mounting pegs is positioned a solid semiconductor rectifier element 62 with the conductors 64 for the rectifier elements being connected in series to adjacent rectifier elements. In the illustrated form of the invention, the conductors 64 mount the rectifier elements to the pegs 60 by turns of the conductors about the pegs.

The pegs 60 also support the resistance means which are shunt-connected across each of the solid semiconductor rectifier elements. The conductors 68 of the resistance means 66 mount the resistance means to opposed pairs of pegs 60 in a manner similar to that mounting the rectifier elements.

The first in the series of the rectifier elements, which is designated 62', is connected to the lead-in strip 54 while the last in the series of rectifier elements generally designated 62" is connected to the conductor element 58 at the lower end of the casing.

The lower end of the casing 50 is supported on a base plate member 70 which, in the illustrated form of the invention, is electrically conductive and is provided with a plurality of spring-clip elements 72 which engage the metallic band 56 at the lower end of the casing. The spring-clip elements 72 function as a means for maintaining the casing 50 in aligned relationship on the base plate 70 and also provide electrical contact between the ring 56 on the casing and the metallic base 70.

The upper end of the casing 50 supports a top or cover plate 74 which, like base ring 70, is electrically conductive, and is provided with a plurality of spring-clip elements 76 which engage the metallic ring 52 to provide electrical contact between the cover plate 74 and the lead-in ring structure.

The casing 50 is also provided with upper and lower openings generally designated 78 and 80, respectively, and supported within the upper end of the casing 50 is a resilient bladder element 82 more clearly illustrated in Figs. 1 and 2. The bladder element provides for expansion and contraction of an insulating and cooling liquid as to be more fully described hereinafter.

The base 70 supports a cylindrical shell generally designated 84 which shell like casing 50 may be constructed of an electrical insulating material. The shell 84 is mounted to the base ring 70 by cooperating thread means 86 and the inside diameter of the shell 84 is large enough to telescopically receive the casing 50 and its supported peg and rectifier elements. The upper end of the shell 84 threadedly engages a ring element 88 which ring element supports a cylindrical extended surface heat conducting member 90. The heat conducting member 90 may be constructed of copper, aluminum or the like, and the cylindrical outer surface thereof is provided with a plurality of heat conducting fins 92 with the outer ends of the fins secured to a steadying and further heat conducting ring member 94, and to minimize corona discharge from fins 92.

The top or cover 7 of the assembly is in sealing engagement with the upper end of the extended surface heat conducting member 90 and the fins 92 and outer steadying and heat conducting ring 94 extend radially beyond the radial extension of the cover 74. With this form of construction, air is permitted to convectively circulate about the fins, the outer wall of the extended surface heat conducting member 90 and the inner and outer surface of the outer heat conducting and fin engaging ring 94.

During operation of the device, the space within the casing 50 below the lower surface of the resilient bladder 82 is filled with an insulating heat conducting liquid such as conventional transformer oil and the space between the outer surface of the casing and the inner surface of the shell 84 between the lower plate 70 and the cover 74 is similarly filled with insulating and heat conducting liquid. With the arrangement hereinbefore described, the oil in the space between the casing and the shell may circulate into and out of the inner portion of the casing through the upper and lower openings 78 and 80 and into contact with the inner surface of the extended surface heat conducting member 90. The bladder 82 positioned within the casing 50 provides room for expansion of the insulating fluid as its temperature is raised during operation of the assembly.

The improved rectifier assembly is connectable into an electrical circuit by means of, for example, a screw-type connector 98 engaging the electrical conductive top 74 of the assembly and by one or more plug-in pins generally designated 100, the inner ends of which threadedly engage the electrical conductive base 70 whereby pins 100 and connector 98 are connected respectively to the first in the series of rectifier elements 62' and the last in the series of rectifier elements 62".

In operation of the rectifier assembly of the present invention, the assembly may be plugged into a suitable socket mounted on the top of a conventional bushing supported on top of a step-up transformer with a conductor from one end of the transformer coil being connected to ground and to one of the complementary electrodes of a load device. The other contact 98 is connected by conductor to the other electrode of the load device to provide for half-wave single-phase rectification.

While a preferred embodiment of the invention has been illustrated in the drawings, it will be apparent to those skilled in the art that the lower pins of the assembly may be insulated from each other and connected respectively to the first and to the last in the series of the rectifier elements instead of having the first in the series of the rectifier elements connected to a top connecter 98. It will also be apparent to those skilled in the art that while the illustrated assembly includes only resistor elements 60 in shunt with each of the rectifier elements, a capacitor in shunt with the rectifier elements may be employed along with the resistors. Further, it will be understood that the form of the extended surface heat conducting member 90 may be variously modified; for example, the wall 90 need not be cylindrical but may be corrugated to provide additional surface contact between the heat conducting member and the insulating fluid within the shell 84. Likewise, while a spiral arrangement of the individual rectifier elements on the casing 50 has been illustrated, other arrangements of the rectifier elements upon the casing 50 may be resorted to within the scope of the present invention.

*Example*

A rectifier assembly for 100 kv. peak inverse voltage at .75 amperes is made by mounting 250 diode type silicon rectifier elements in a spiral array to a casing having an outside diameter of about 3 inches and a length of about 24 inches. Each of the silicon rectifier elements is provided with a 150,000 ohm resistor and are spirally arranged about the inner casing, 10 per turn, 25 turns ¾ inch pitch per revolution. The casing and rectifier resistor assemblies are telescopically received in an insulating shell having an inside diameter of about 6 inches and a length of about 18 inches. On top of the shell is mounted a heat dissipating air type cooler constructed of copper and having a height of about 6 inches and provided with 45 equally spaced copper fins between the inner and outer ring members. The entire assembly with the exception of the expansion bladder is filled with a conventional transformer oil. The improved assembly operated satisfactorily with a maximum rise in temperature of the cooling oil of 37° C. when dissipating 140 watts.

It will be apparent that the embodiments shown is only exemplary and that various modifications can be made in the construction and arrangement within the scope of this invention as defined in the appended claims. For example, other forms of heat dissipating radiators may be provided for the improved device and good heat dissipation may be provided by construction of the outer cylindrical shell from alumina ceramic material which has good heat conducting properties and also has electrical insulating properties. It will also be evident that where a full wave bridge rectification is desired, the four rectifying assemblies could be replaced by two superposed units. The superposed units would be provided with a single center tap or connector and a connector at each end to provide a conventional bridge circuit. Further, where desired, each assembly may be provided with a radio-frequency choke to eliminate radio-frequency interference and in place of the bladder 82, a gas expansion space may be used. The gas expansion space would be particularly advantageous where the cooling material comprises a liquid dielectric, such as the fluorocarbons placed within the assembly under pressure.

We claim:

1. An alternating current rectifier assembly comprising a hollow elongated casing, a plurality of rectifier elements mounted on said casing, conductor means serially connecting each of said rectifier elements, a hollow elongated shell telescopically receiving said casing and radially outwardly spaced therefrom, a base member mounting said casing and said shell, an insulating liquid within said casing and between the casing and said shell, an extended surface heat conducting member presenting one face to said insulating liquid and the other face to ambient air, and conductor means connecting the first and last of said series connected rectifier elements to separate electrical conductive terminals.

2. The invention defined in claim 1 including a top for said assembly engaging said casing and said shell.

3. The invention defined in claim 2 wherein one of said conductive terminals is provided in said top and another of said conductive terminals is provided in said base member.

4. The invention defined in claim 3 wherein said conductive terminal provided in said base member is adapted to be slidably received in a socket.

5. The invention defined in claim 1 including resilient means maintained in said assembly having a surface in contact with said insulating liquid, said resilient means adapted to provide for thermal expansion of said insulating liquid.

6. The invention defined in claim 5 wherein said resilient means comprises a gas filled bladder.

7. The invention defined in claim 1 wherein the extended surface heat conducting member is provided with a plurality of heat conducting fins presented to the ambient air.

References Cited in the file of this patent

UNITED STATES PATENTS 2,189,617  Siebert et al. _____ Feb. 6, 1940